US011862126B2

(12) United States Patent
Hung et al.

(10) Patent No.: US 11,862,126 B2
(45) Date of Patent: Jan. 2, 2024

(54) INSET WINDOW ALTERATIONS

(71) Applicant: HEWLETT-PACKARD DEVELOPMENT COMPANY, L.P., Spring, TX (US)

(72) Inventors: Chih-Chen Hung, Taipei (TW); Hung-Ming Chen, Taipei (TW); Chia-Wen Chuang, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/668,735

(22) Filed: Feb. 10, 2022

(65) Prior Publication Data

US 2023/0252957 A1 Aug. 10, 2023

(51) Int. Cl.
| | |
|---|---|
| *G06F 3/0481* | (2022.01) |
| *G09G 5/14* | (2006.01) |
| *G06V 40/20* | (2022.01) |
| *G06V 40/16* | (2022.01) |
| G09G 5/373 | (2006.01) |
| G09G 5/377 | (2006.01) |
| G06V 20/40 | (2022.01) |

(52) U.S. Cl.
CPC ............. *G09G 5/14* (2013.01); *G06F 3/0481* (2013.01); *G06V 40/171* (2022.01); *G06V 40/23* (2022.01); *G06V 20/40* (2022.01); *G06V 40/161* (2022.01); *G06V 40/20* (2022.01); *G09G 5/373* (2013.01); *G09G 5/377* (2013.01); *G09G 2340/04* (2013.01); *G09G 2340/12* (2013.01)

(58) Field of Classification Search
CPC ...... G09G 5/14; G06F 3/0481; G06V 40/171; G06V 40/23
See application file for complete search history.

(56) References Cited

U.S. PATENT DOCUMENTS

| | | | |
|---|---|---|---|
| 6,697,124 B2 | 2/2004 | Dimitrova | |
| 8,359,541 B1 * | 1/2013 | Landry | G06F 3/04842 715/764 |
| 9,357,262 B2 | 5/2016 | Vanduyn | |
| 9,594,947 B1 * | 3/2017 | Kotagiri | G06V 40/161 |
| 10,666,902 B1 * | 5/2020 | Mahendru | H04N 7/15 |
| 10,863,230 B1 * | 12/2020 | Pham | H04N 21/6547 |
| 11,487,398 B1 * | 11/2022 | Wei | G06F 3/0481 |

(Continued)

*Primary Examiner* — Tuyetlien T Tran
(74) *Attorney, Agent, or Firm* — Knobbe, Martens, Olson & Bear, LLP

(57) ABSTRACT

An example non-transitory machine-readable storage medium includes instructions to, when executed by the processor, identify an object depicted in a video scene, wherein the video scene is displayed in a graphical user interface (GUI). The example instructions are executable to 1) identify coordinates of the object depicted in the video scene, wherein the coordinates are relative to the GUI and 2) identify coordinates of an inset window which is smaller than the GUI and overlaps the video scene. The example instructions are executable to compare the coordinates of the object with the coordinates of the inset window to determine an overlap of the inset window with the object. Responsive to an identified overlap of the inset window and the object, the instructions are executable to alter a display characteristic of the inset window to avoid the overlap of the inset window with the object.

20 Claims, 7 Drawing Sheets

(56) References Cited

U.S. PATENT DOCUMENTS

| | | | |
|---|---|---|---|
| 2002/0089523 A1 | 7/2002 | Hodgkinson | |
| 2006/0069808 A1* | 3/2006 | Mitchell | G06F 16/9577 707/E17.121 |
| 2007/0094612 A1* | 4/2007 | Kraft | G06F 3/0481 715/808 |
| 2007/0192734 A1* | 8/2007 | Berstis | G06F 3/0481 715/808 |
| 2009/0009424 A1 | 1/2009 | Kang | |
| 2009/0033681 A1* | 2/2009 | Dolph | G06T 17/05 345/441 |
| 2010/0188579 A1 | 7/2010 | Friedman | |
| 2011/0078623 A1* | 3/2011 | Liu | G06Q 30/02 715/791 |
| 2011/0148917 A1* | 6/2011 | Alberth, Jr. | G09G 5/14 345/629 |
| 2012/0268454 A1* | 10/2012 | Yokoi | H04N 13/361 345/419 |
| 2014/0032679 A1* | 1/2014 | Tandon | H04L 12/1827 709/205 |
| 2014/0232739 A1* | 8/2014 | Kim | G09G 5/14 345/592 |
| 2014/0359656 A1* | 12/2014 | Banica | H04N 21/234 725/32 |
| 2015/0033125 A1* | 1/2015 | Kang | G06F 3/0485 715/719 |
| 2016/0284321 A1* | 9/2016 | Cho | G06F 3/04817 |
| 2017/0169592 A1* | 6/2017 | Ruble | G06T 3/40 |
| 2018/0007449 A1* | 1/2018 | Carlson | H04N 21/42209 |
| 2018/0205904 A1* | 7/2018 | Baughman | H04N 21/25891 |
| 2019/0346994 A1* | 11/2019 | Bastide | G06F 3/013 |
| 2020/0321029 A1* | 10/2020 | Cui | H04N 5/76 |
| 2020/0349315 A1* | 11/2020 | Wang | G06F 40/106 |
| 2020/0351543 A1* | 11/2020 | Kerofsky | H04N 21/4316 |
| 2020/0412780 A1* | 12/2020 | Devendran | G06N 20/00 |
| 2021/0200431 A1* | 7/2021 | Xiao | G06F 3/04883 |
| 2021/0241518 A1* | 8/2021 | Tong | H04N 23/60 |
| 2021/0329342 A1* | 10/2021 | Fidaleo | H04N 21/478 |
| 2022/0006972 A1* | 1/2022 | Jia | H04N 7/142 |

\* cited by examiner

INSET WINDOW ALTERATIONS

BACKGROUND

Computing devices allow interaction between users of different computing devices. For example, via a videoconferencing application, a user at one computing device can engage in video and audio communication with a user at another computing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1A:
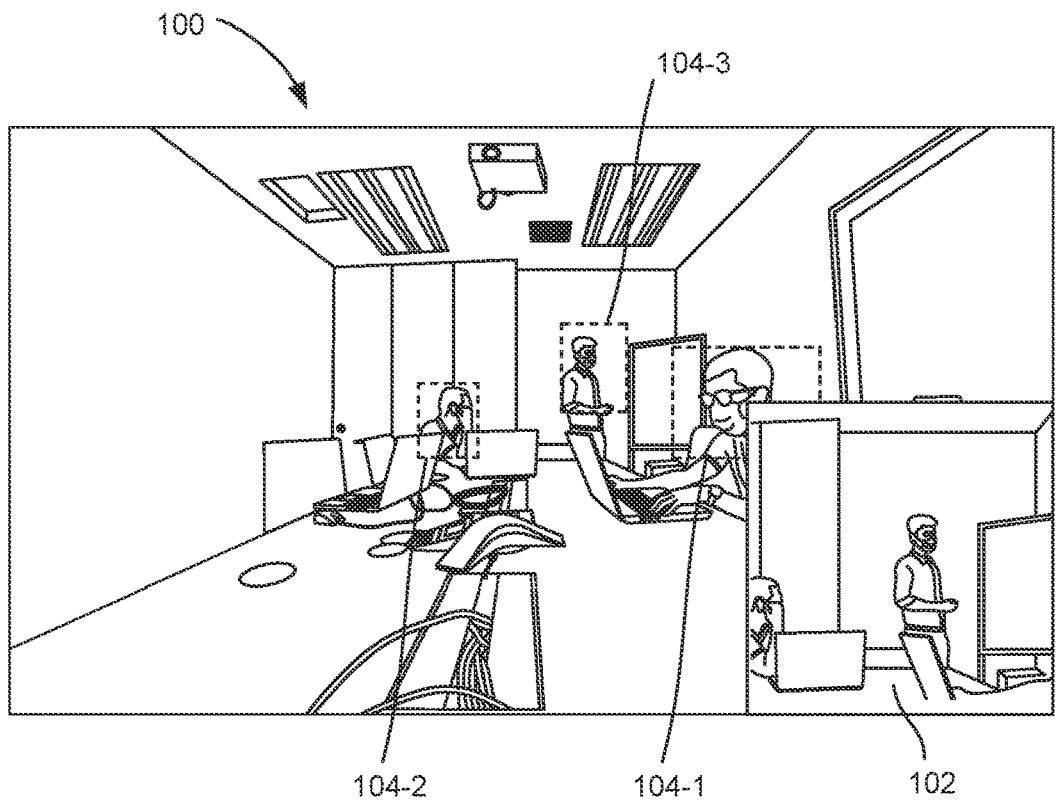
FIGS. 1A and 1B depict the alteration of an inset window of a graphical user interface (GUI), according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices are used by millions of people daily to carry out business, personal, and social operations and it is not uncommon for an individual to interact with multiple computing devices on a daily basis. Examples of computing devices include desktop computers, laptop computers, all-in-one devices, tablets, and gaming systems to name a few. In some cases, these computing devices are used to communicate with other users via video and audio. For example, a videoconferencing application executing on a computing device may allow a user to see and interact with users in remote locations.

A video conferencing application may generate an inset window over the video conference. Such an inset window may present a secondary video stream to that presented in the video conference. An inset window may be a window on a graphical user interface that is smaller than the graphical user interface and is overlaid on top of another window. In an example, the inset window is disposed within the borders of the other window and may display video content that is different than the content of the other window. For example, within a room of multiple users, one of the users may be speaking. The inset window may present a focused view of the speaker such that remote participants may be aware of, and may pay attention to, the speaker. Such a focused view allows a remote participant to identify the speaker and to observe facial and bodily gestures to derive additional meaning from the communication. Such an inset window, which may be referred to as a picture-in-picture window, allows a remote participant to be more involved in the video conference. While particular reference is made to an inset window displaying a different perspective of the scene presented in the underlying window, the inset window may present any variety of different content, such as a different video stream or a different application.

In some situations, the inset window may be placed in a corner of the video scene that is being displayed. However, it may be the case that the inset window obscures objects of interest, such as the users, in the room of the video conference. For example, an inset window may block one of the users in the video scene, perhaps even the speaker, such that the remote participant has an obscured view of the events or interactions in the video scene. This is exacerbated as the users in the video scene move around. For example, a user in the video scene may move to a location that is behind the inset window. Accordingly, a previously unobscured user is now obscured by the overlaid inset window.

To address this, a remote participant may instruct a user in the video scene to move location so as to not be blocked. This may be cumbersome and may interrupt the flow of the meeting. In another example, the remote participant may move the inset window manually. However, this manual adjustment of the inset window also interrupts the meeting as the remote participant diverts his or her attention from the video scene to the control of the inset widow.

Accordingly, the present specification describes a non-transitory machine-readable storage medium and method to determine a location of an inset window on the GUI. The location of the inset window is determined based on objects of interest, such as users, identified in the GUI. Specifically, the location of the inset window is selected to avoid overlapping with any of the objects of interest. Specifically, the method includes performing object recognition to detect objects in the video scene. The location of the objects are defined by coordinates relative to the GUI. The method may include automatically tracking the objects as they move throughout the video scene as well.

The inset window also has coordinates. During execution of the video streaming application, the inset window coordinates are compared with the object coordinates. The system moves the inset window responsive to any overlap between the coordinates of the inset window and the coordinates of the object. As such, the method and non-transitory machine-readable storage medium automatically detect objects of interest and move the inset window to a location where it does not overlap, or where it minimally overlaps, the tracked objects.

Specifically, the present specification describes a non-transitory machine-readable storage medium encoded with instructions executable by a processor of a computing device. As used in the present specification and in the appended claims, the term "non-transitory" does not encompass transitory propagating signals. The instructions, when executed by the processor, cause the processor to 1) identify an object depicted in a video scene, wherein the video scene is displayed on a graphical user interface (GUI) and 2) identify coordinates of the object depicted in the video scene, wherein the coordinates are relative to the GUI. The instructions are also executable by the processor, to cause the processor to 1) identify coordinates of an inset window which is smaller than the GUI and overlaps the video scene and 2) compare the coordinates of the object with the coordinates of the inset window to determine an overlap of the inset window with the object. Responsive to an identified overlap of the inset window and the object, the instructions are executable by the processor to cause the processor to alter a display characteristic of the inset window to avoid the overlap of the inset window with the object.

The present specification also describes a method. According to the method, a processor of a computing device identifies a user depicted in a video scene, wherein the video scene is displayed in the GUI. The processor also identifies coordinates of the user depicted in the video scene, wherein the coordinates are relative to the GUI. The processor also identifies coordinates of an inset window which is smaller than the GUI and overlaps the video scene. The processor compares the coordinates of the user with the coordinates of the inset window to determine an overlap of the inset window with the user and responsive to an identified overlap of the inset window and the user, the processor alters a display characteristic of the inset window based on a movement of the user in the video scene to avoid overlap of the inset window and the user.

In another example, the instructions are executable by the processor to cause the processor to identify a user depicted in a video scene, wherein the video scene is displayed on the GUI and generate a bounding box around a head of the user. The instructions are executable to identify coordinates of 1) the bounding box of the head of the user, wherein the coordinates are relative to the GUI and 2) an inset window which is smaller than the GUI and overlaps the video scene. The instructions are executable to compare the coordinates of the bounding box with the coordinates of the inset window to determine an overlap of the inset window with the bounding box. Responsive to an identified overlap of the inset window with the user, the instructions are executable by the processor to alter a display characteristic of the inset window to avoid the overlap of the inset window with the user.

Figure 1B:
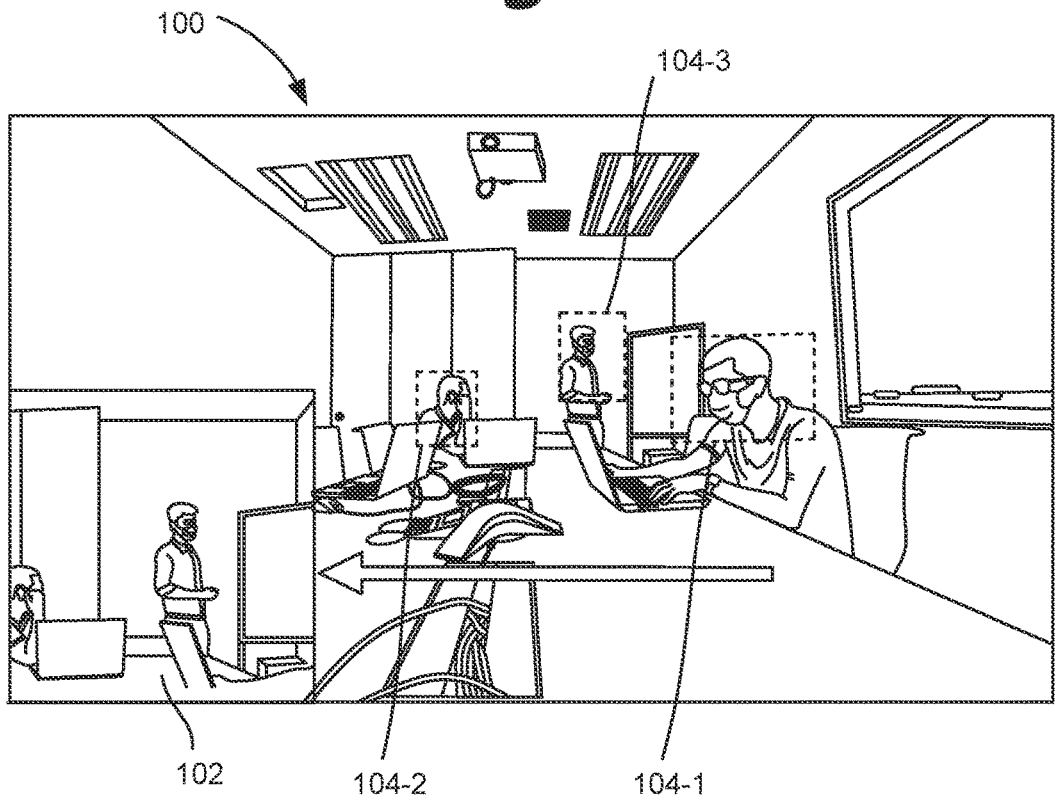

Turning now to the figures, FIGS. 1A and 1B depict the alteration of an inset window 102 of a GUI 100, according to an example. The GUI 100 presented in FIGS. 1A, 1B, 3A, and 3B may be displayed on any number of computing devices including a desktop computer display device, a laptop display device, a tablet, a smartphone or any number of other computing devices.

As described above, a video scene may be presented on the GUI 100. The video scene may present a variety of content. In the example depicted in FIGS. 1A, 1B, 3A, and 3B, the video scene is of multiple users in a meeting room. As described above, an inset window 102 may be overlaid on top of the video scene to enhance the experience of remote participants. For example, due to low resolution or the size of the GUI 100, the remote participant may be unaware of which user is speaking, and therefore which user should command their attention. Accordingly, an inset window 102 may be presented which highlights a particular user, such as a speaker. That is, the inset window 102 may depict the user corresponding to an active speaker, which in this case is the third user at the rear of the room. While particular reference is made to particular content presented in the inset window 102, other content, such as a separate video stream, may be presented in the inset window 102.

FIG. 1A depicts a scenario where the inset window 102 overlaps the video scene and obscures the presentation of some of the users in the video. This may be distracting to the remote participant and may negate or negatively impact the intent of the video communication. Accordingly, the present specification describes the alteration of the inset window 102 based on detected objects of interest, which in this case are users, in the video scene. For example, as depicted in FIG. 1B, the inset window 102 may be moved to a location within the video scene where it does not block the objects of interest. As depicted in FIG. 1B, the first user is no longer blocked by the inset window 102 such that the remote participant has an unobstructed view of all users.

Figure 3A:
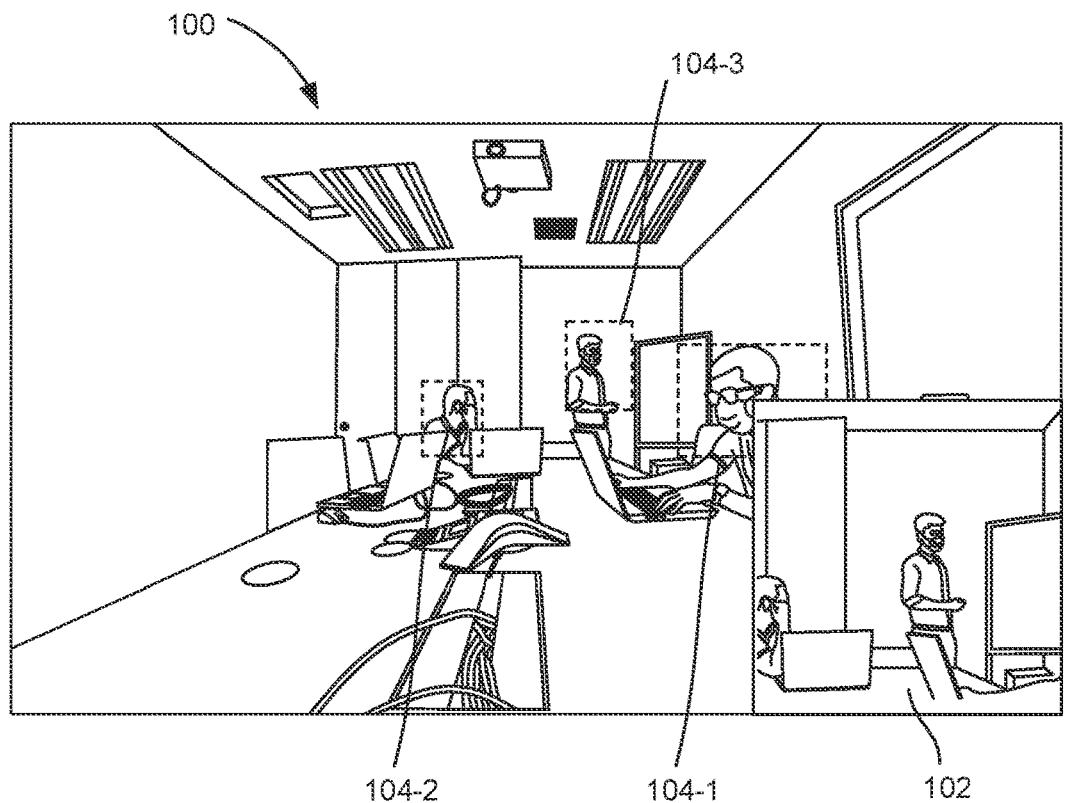
FIGS. 3A and 3B depict the alteration of an inset window of a GUI, according to an example.
Figure 3B:
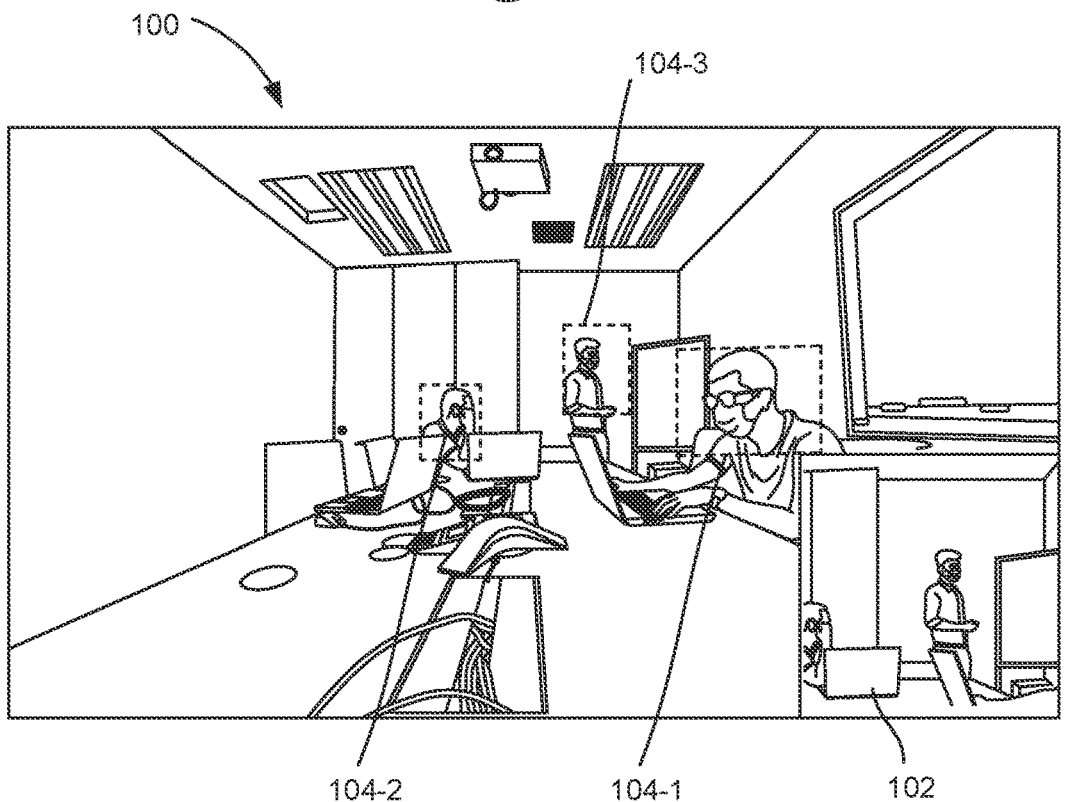

While FIG. 1A depicts the alteration of the inset window 102 being a movement of the inset window 102, another example of an alteration is depicted in FIGS. 3A and 3B where the inset window 102 is reduced in size to prevent, or avoid, any overlap with an object of interest.

In the example depicted in FIGS. 1A and 1B, each object of interest is enveloped by a bounding box 104-1, 104-2, 104-3, which may be used to identify an overlap that triggers movement of the inset window 102. In other examples, different methods of locating users and identifying overlap may be performed.

Figure 2:
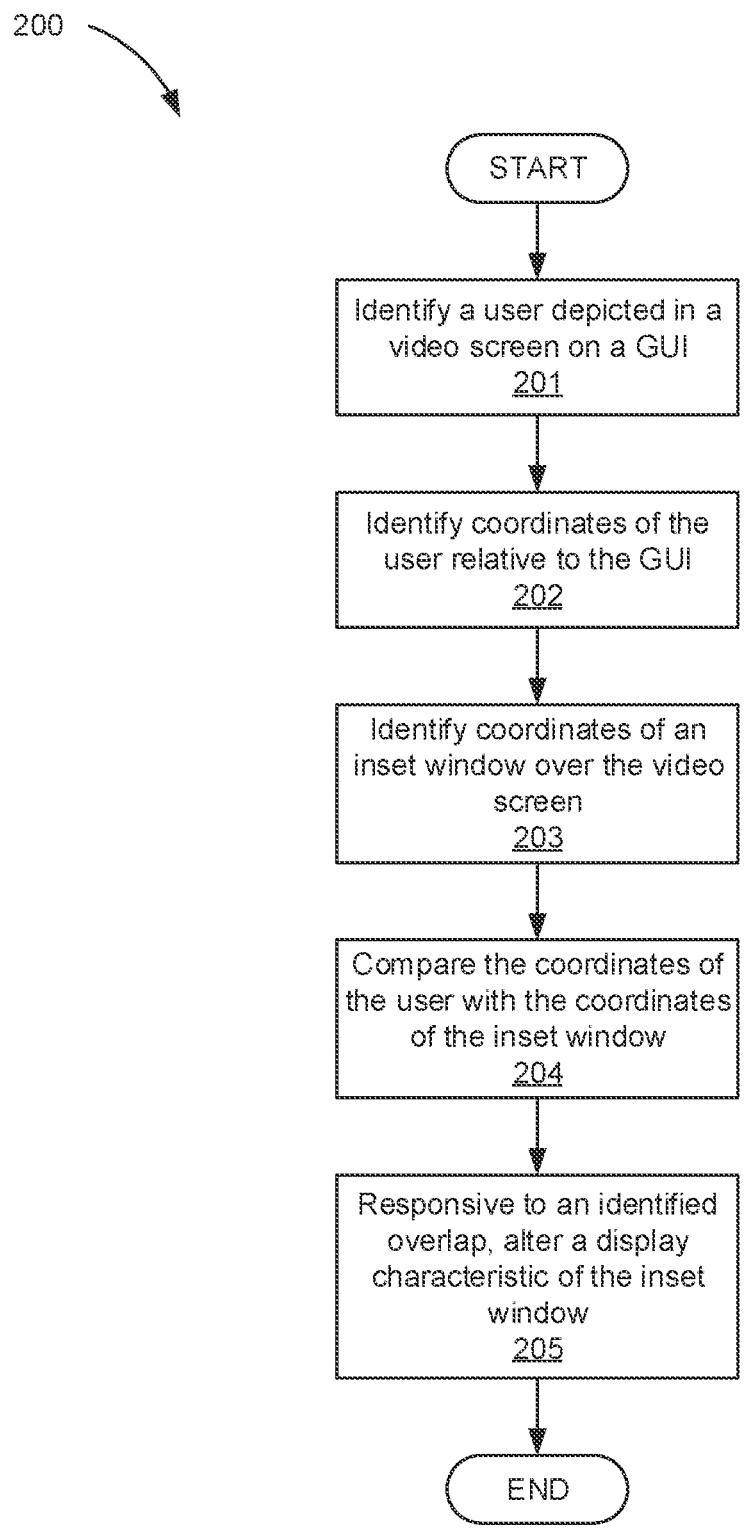
FIG. 2 is a flowchart of a method for altering an inset window of a GUI, according to an example.

FIG. 2 is a flowchart of a method 200 for altering an inset window 102 of a GUI 100, according to an example. At step 201, the method 200 includes identifying, via a processor of a computing device, a user depicted in a video scene which video scene is displayed in a GUI 100. While FIG. 2 depicts identification of a user of interest, as described above any variety of other objects of interest may be identified and tracked. Identifying a user, or other object of interest, depicted in the video scene may include performing object identification.

Identifying an object or user may occur in a variety of ways. For example, a processor of the computing device may identify a landmark feature on the face of the user. That is, the face of the user has certain landmark features, such as the eyes, mouth, nose etc. that may be identified via machine-learning to identify the object as a user. Using a machine-learning model, the processor may identify the head and/or body of the user from these landmark features. That is the machine-learning engine may analyze the image of a user as captured by a capture device. The machine-learning engine may compute and map the features of the objects with regards to the face models library.

Such machine-learning identification of the user may occur regardless of the orientation of the user. That is, the processor may identify the head of a user whether the user is facing a capture device or is facing a direction perpendicular to the capture device. In some examples, the identification of the user may include generation of a bounding box 104 around the users as depicted in FIGS. 1A, 1B, 3A, and 3B. Such a bounding box 104 may simplify the calculation of an overlap of the inset window 102 with the user. That is, a bounding box 104 may be generated around the user to envelop the landmark features and a buffer area around the landmark features. While particular reference is made to identifying users in the video scene, other objects of interest may be identified in the video scene. Accordingly, the present method 200 allows for the alteration of an inset window 102 so as to provide a desired presentation of any identified object of interest, which objects may be users in the video scene.

In another example, of the object of interest may be based on user input. For example, a user may draw the bounding box 104 around an object of interest that is to be obstruction free. While particular reference is made to particular operations to identify the user, or other object of interest, depicted in the video scene, other operations may be performed as well.

At step 202, the method 200 includes identifying, via the processor, coordinates of the user relative to the GUI 100.

That is, the GUI may have a coordinate system that may be used to define the position of various objects depicted therein. As will be described below, the coordinates of the objects, and particularly of the corners of the objects, may be used to identify an overlap between objects on the GUI 100 with the inset window 102 that overlaps the video scene.

In a particular example, the top left-hand corner of the GUI 100 depicted in FIGS. 1A and 1B may be the origin and may have coordinates 0, 0. The location of other objects within the GUI 100 may be based of this origin. The x-coordinate values increase moving in a rightward direction and the y-direction coordinate values increase moving in a downward direction in the view of FIGS. 1A and 1B.

In some examples the coordinates of the bounding boxes 104, as well as the inset window 102 may identify the top right corner coordinates, followed by a length and width of the bounding box 104. For example, the coordinates for the first user bounding box 104-1 may have the notation (1630, 544) 354×236 where 1630 is the x-coordinate of the upper left-hand corner of the first user bounding box 104-1, 544 is the y-coordinate of the upper left-hand corner of the first user bounding box 104-1, 354 is the width in the x-direction, and 236 is the height in the y-direction. Given this notation, the upper left-hand corner of the first user bounding box 104-1, which may be designated as P1-, is found at the coordinates (1630, 544) relative to the GUI. The lower right-hand corner of the first user bounding box 104-1, which may be designated as -P1, has the coordinates (1984, 780).

At step 203, the method 200 includes identifying coordinates of the inset window 102. As depicted in FIGS. 1A and 1B, the inset window 102 is smaller than the GUI 100 and overlaps the video scene. Similar to coordinates for the bounding boxes 104 of the users, the processor may identify coordinates of the inset window 102. For example, the processor may identify the upper left-hand, P0-, coordinates of the inset window 102 to be (1920, 760) and the lower right-hand coordinates for the inset widow 102, -P0, as (2560, 1440). The coordinates of the bounding boxes 104 and the inset window 102 provide a mechanism by which it may be determined that the inset window 102 is overlapping the objects of interest.

Accordingly, at step 204, the method 200 includes comparing, via the processor, the coordinates of the bounding box 104 surrounding the user, with the coordinates of the inset window 102 to determine an overlap of the inset window 102 with the user, or other object of interest. As depicted in FIGS. 1A and 1B, such a comparison may be of different corners of the respective elements. That is, comparing the coordinates of the object with the coordinates of the inset window 102 may include comparing the coordinates of a first corner of the bounding box 104 for the user or other object, with coordinates of a second corner of the inset window 102, where the first corner is opposite the second corner.

In the example depicted in FIGS. 1A and 1B, the lower right-hand corner coordinates of the first user bounding box 104-1 may be compared with the upper left-hand corner coordinates, (i.e., the opposite of the lower right-hand corner) of the inset window 102. By comparing the coordinates of these opposing corners, the processor may determine whether there is any overlap. As an example, given the lower right-hand coordinates of the first user bounding box, -P1, of (1984, 780) and given the upper left-hand coordinates of the inset window bounding box, P0-, of (1920, 760) the processor may compare the opposite corners to determine if P0-X is less than -P1X and whether P0-Y is less than -P1Y.

If both these conditions are met, the processor determines that there is an overlap. In FIG. 1A, P0-X, which is 1920, is less than -P1X, which is 1984 and P0-Y, which is 760 is less than -P1Y which is 780. Accordingly, the processor may determine that there is an overlap of the inset window 102 with the first user bounding box 104-1. Similar comparisons may be made between the inset window 102 and the other bounding boxes 104-2, 104-3. Note that while a particular example has been provided of comparing an inset window 102 at a lower right-hand corner of the GUI 100 with a single bounding box 104, similar comparisons may be made between the inset window 102 and the bounding boxes 104-1, 104-2, 104-3, when the inset window 102 is initially located in a different corner.

Accordingly, at step 205, the method 200 includes altering a display characteristic of the inset window 102 responsive to the identified overlap. The alteration may take a variety of forms. For example, as depicted in FIGS. 1A and 1B, the alteration may include moving the inset window 102 to a different location, which different location still overlaps the video scene. Such a movement of the inset window 102 may occur in a variety of ways.

For example, the processor may move the inset window 102 to a different location. With the inset window 102 at the different location, the processor may compare the coordinates of the object bounding box 104 with the coordinates of the inset window 102 at the different location to determine if an overlap exists with the inset window 102 at the different location. That is, in this example determination of overlap at the different location occurs following movement of the inset window 102 to the different location. For example, were the inset window 102 moved to the position depicted in FIG. 1B, the upper right-hand corner coordinates of the inset window 102 may be compared against the lower left-hand corner coordinates of the bounding boxes 104, including the second user bounding box 104-2. However, as depicted in FIG. 1B, such an overlap does not exist, and so the inset window 102 may remain at this location. Were an overlap to exist, the processor may again move the inset window 102 to a new location and again test for an overlap.

In another example, the processor may determine a non-overlapping location for the inset window 102 prior to moving the inset window 102. That is, the processor may compare the coordinates of the bounding boxes 104 with the coordinates of the inset window 102 at multiple candidate locations to determine if there is any overlap of the inset window 102 with the objects, were the inset window 102 moved to the multiple candidate locations. In this example, the processor may move the inset window 102 to the candidate location which would result in no overlap of the inset window 102 with the bounding boxes 104. That is, in the previous example, the processor may identify the new location of the inset window 102 via trial and error whereas in this example, the processor may preemptively determine a location for which there will be no overlap and move the inset window 102 to that location.

In some examples, it may be that the inset window 102 overlaps the objects/users regardless of the position of the inset window 102. Accordingly, in this example, the processor may identify the candidate location for which the inset window 102 would be largest without overlap of the inset window 102 with the object. That is, in addition to moving the inset window 102 the processor may potentially resize the inset window 102. As a particular example, if positioned in the lower left-hand corner, the inset window 102 may be maintained at a first size to avoid overlap. In this example, it may be the case that if the inset window 102 were positioned in the upper right-hand corner, upper left-hand corner, or in the lower right-hand corner, the inset window 102 would be reduced to a second size, which is smaller than the first size, to prevent overlap. In this example, the processor may move the inset window 102 to the candidate location, i.e., the lower left-hand corner, which would result in the largest inset window 102 without overlapping the inset window 102 with the object of interest.

As yet another example, it may be desirable to maintain the inset window 102 a certain size, even if doing so would result in overlap. That is, as compared to the above example, if each of the candidate locations would result in overlap of the inset window 102 with the objects, rather than re-sizing the inset window 102, the processor may position the inset window 102 in a location which has a reduced amount of overlap.

Accordingly, the processor may identify from a set of regions having a same size as the inset window 102, a region which would result in the least amount of overlap of the inset window 102 with the object. In this example, "least amount of overlap" may be determined based on the coordinates of the bounding boxes 104 and the inset window 102. That is, the overlapping region may have an area which may be determined based on a comparison of the coordinates of the bounding box with the coordinates of the inset window 102. Accordingly, the region with the "least amount of overlap" may refer to the region where the overlap between the inset window 102 and the bounding box 104 has the smallest area. In this example, the processor may move the inset window 102 to the region which would result in the least amount of overlap of the inset window 102 with the bounding box 104.

In this case where overlap exists even after movement, the processor may further alter the display characteristic of the inset window 102. For example, the processor may alter a transparency of the inset window 102 responsive to the least amount of overlap being greater than a threshold amount. For example, if the inset window 102 overlaps a bounding box 104, but less than a threshold amount such as 10%, the inset window 102 may be maintained at full opacity. However, if the inset window 102 overlaps the bounding box by a higher amount such as 25%, then the inset window 102 may be altered to have a higher transparency value, such as for example 25%. While particular reference has been made to different threshold amounts of overlap and transparency levels, any threshold amount and transparency level may be implemented in accordance with the principles described herein. In some particular examples, the amount of transparency may be based on the amount of overlap.

In some examples, the alteration that is made is based on a movement of the object of interest in the video scene. That is, in video streams, the multiple users may not be stationary and may be moving. In this example, the processor may track the movement of the objects of interest and update the bounding boxes 104 that surround the users. As such, the adjustment to the inset window 102 may be dynamic and automatic throughout the remote communication to ensure that there is no overlap between the inset window 102 and any object of interest, regardless of the motion of the object of interest.

Accordingly, rather than relying on pixel or texture analysis to determine where to position an inset window 102, the present method 200 adjusts the position, size, or other display characteristic based on machine-learning identification of objects and tracking those objects as they move through a video scene. Moreover, the present method 200 is a coordinate-based determination regarding the overlap between objects of interest in the video scene. While FIGS. 1A and 1B depict, and FIG. 2 describes, comparison of a single user bounding box 104 with an inset window 102, the method may compare various object bounding boxes 104 with an inset window 102 to determine a desired placement of the inset window 102. Moreover, while FIGS. 1A and 1B depict positioning of the inset window 102 at different corner locations, in some examples, the processor may move the inset window 102 to a non-corner location of the video scene.

FIGS. 3A and 3B depict the alteration of an inset window 102 of a GUI 100, according to an example. As described above, the alterations made to the inset window 102 to prevent overlap with an object bounding box 104 may vary. In the example depicted in FIGS. 3A and 3B, altering the display characteristic of the inset window 102 includes resizing the inset window 102. That is, the processor may compare the opposite corners of the first user bounding box 104-1 and the inset window 102 as described above. If there is a determined overlap, as there is depicted in FIG. 3A, the processor may incrementally decrease the size of the inset window 102 until a comparison of the coordinates of the object bounding box 104 and the coordinates of the inset window 102 indicate no overlap of the inset window 102 with the object.

Note that while FIGS. 1A, 1B, 3A, and 3B depict different alterations, these alterations may be used independently, in combination with one another, and/or with other alterations to present an inset window 102 that does not obstruct the view of the objects of interest, such as users, within the video scene.

Figure 4:
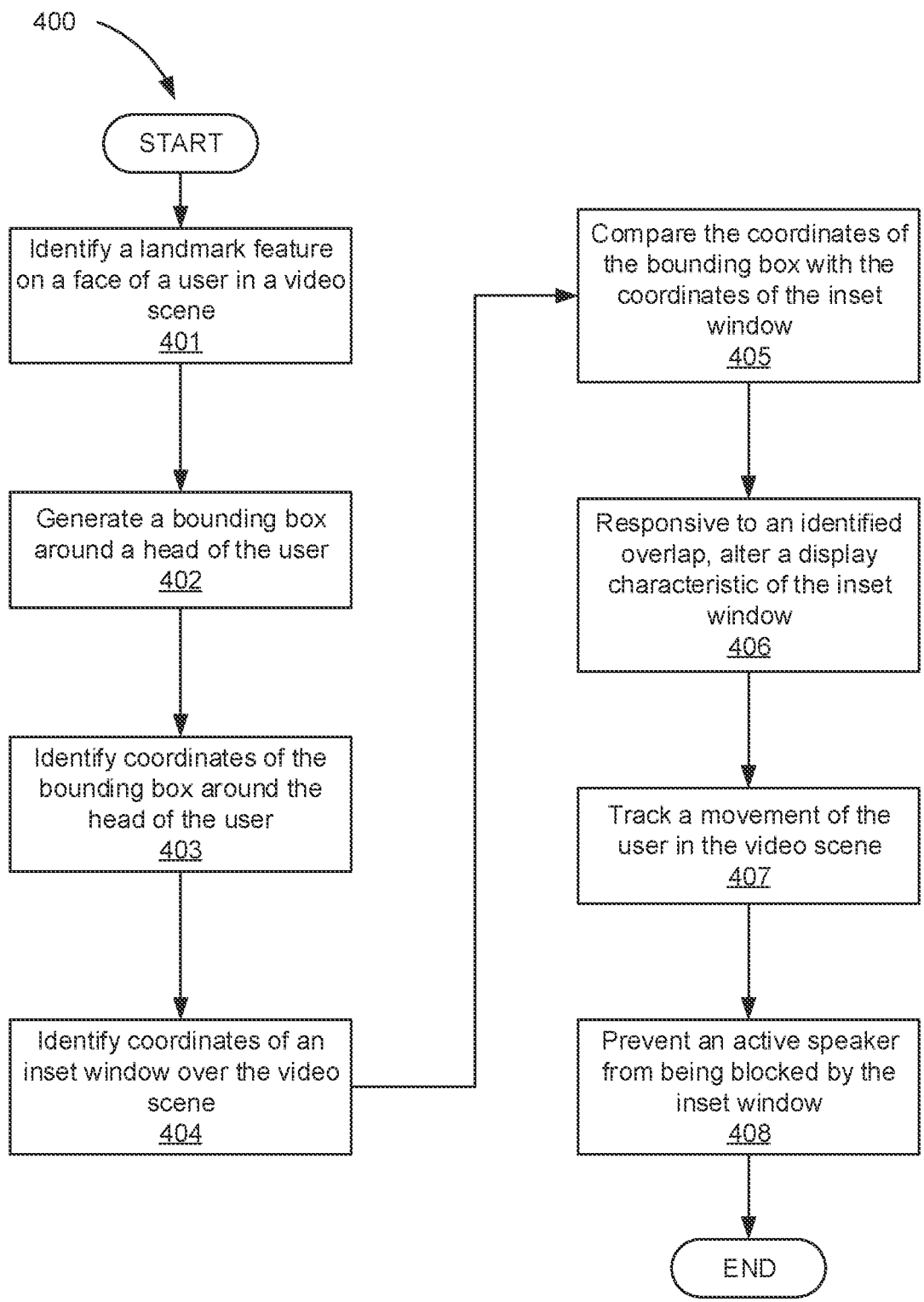
FIG. 4 is a flowchart of a method for altering an inset window of a GUI, according to an example.

FIG. 4 is a flowchart of a method 400 for altering an inset window 102 of a GUI 100, according to an example. At step 401, the method 400 includes identifying a landmark feature on a face of a user in a video scene. That is, as described above, the present methods and systems may track any variety of objects, an example of which is a user. A user may be identified based on the object recognition of landmark features of the user such as the user's eyes, nose, mouth etc.

At step 402, the method 400 includes generating a bounding box 104 around the head of the user. The bounding box 104 therefore is to envelop the landmark feature as well as a buffer area around the landmark feature such that the entirety of the user's head is captured within the bounding box 104.

At step 403, the method 400 includes identifying coordinates of the bounding box 104 around the head of the user and at step 404, the method 400 includes identifying coordinates of an inset window 102 over the video scene. At step 405, the method 400 includes comparing the coordinates of the bounding box 104 with the coordinates of the inset window 102. These operations may be performed as described above in connection with FIG. 2.

At step 406, the method 400 includes altering a display characteristic of the inset window 102. This may be performed as described above in connection with FIG. 2 and may include any variety and combination of alterations including moving the inset window 102, re-sizing the inset window 102, or other alterations.

As described above, in some examples, the alterations may be based on movement of the object of interest. Accordingly, at step 407, the method 400 includes tracking a movement of the user in the video scene. That is, the machine-learning model may be used not only to identify static users, but may be used to identify movement of the users. As such, the present method 400 dynamically and in real-time updates the inset window 102 to provide an unobscured view of the video scene.

As described above, despite the alterations made to the inset window 102 there may still exist some overlap with users in the video scene by the inset window 102. In these examples, the processor may prioritize which objects of interest are overlapped. That is, the processor may identify a region within the video scene that is precluded from being a location to which the inset window 102 is moved. This region may be a location associated with a speaker in the video scene. Accordingly, at step 408, the method 400 includes preventing an active speaker from being blocked by the inset window.

This may be performed in a variety of ways. For example, by analyzing an audio signature associated with the video scene or the video capture system, the processor may identify a source of the audio. When the source of the audio is determined to be a user, that user is designated as a speaker. As such, the processor may, while allowing a degree of overlap with other bounding boxes 104 when there is no option for non-overlap between the inset window 102 and the variety of objects of interest, prevent any overlap with the bounding box 104 associated with the speaker. Thus, when a degree of overlap is inevitable, the processor still ensures engagement of the remote participant by ensuring that the speaker and subject of attention is unobscured.

Figure 5:
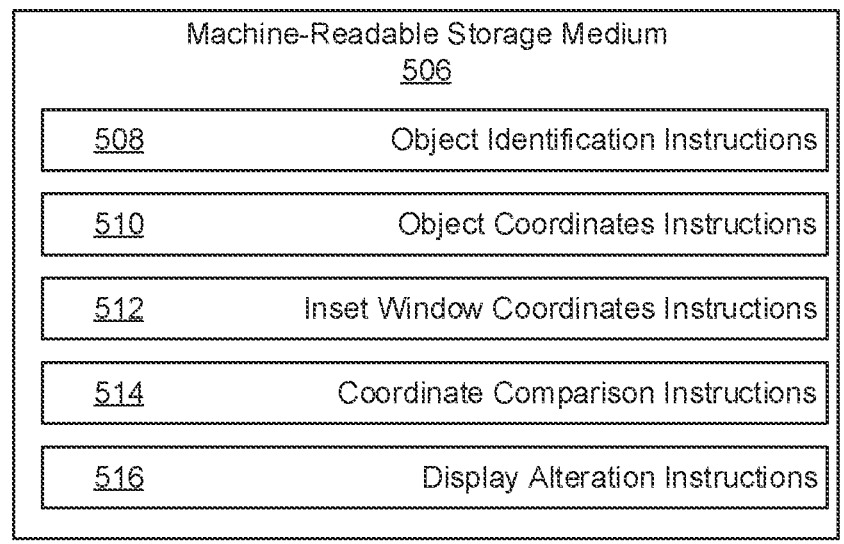
FIG. 5 depicts a non-transitory machine-readable storage medium for altering an inset window of a GUI, according to an example.

FIG. 5 depicts a non-transitory machine-readable storage medium 506 for altering an inset window 102 of a GUI 100, according to an example. As used in the present specification, the term "non-transitory" does not encompass transitory propagating signals.

To achieve its desired functionality, a computing device includes various hardware components. Specifically, a computing device includes a processor and a machine-readable storage medium 506. The machine-readable storage medium 506 is communicatively coupled to the processor. The machine-readable storage medium 506 includes a number of instructions 508, 510, 512, 514, 516 for performing a designated function. The machine-readable storage medium 506 causes the processor to execute the designated function of the instructions 508, 510, 512, 514, 516. The machine-readable storage medium 506 can store data, programs, instructions, or any other machine-readable data that can be utilized to operate the computing device. Machine-readable storage medium 506 can store computer readable instructions that the processor of the computing device can process, or execute. The machine-readable storage medium 506 can be an electronic, magnetic, optical, or other physical storage device that contains or stores executable instructions. Machine-readable storage medium 506 may be, for example, Random Access Memory (RAM), an Electrically Erasable Programmable Read-Only Memory (EEPROM), a storage device, an optical disc, etc. The machine-readable storage medium 506 may be a non-transitory machine-readable storage medium 506.

Object identification instructions 508, when executed by the processor, cause the processor to, identify an object in a video scene, wherein the video scene is displayed in a GUI 100. Object coordinates instructions 510, when executed by the processor, cause the processor to identify coordinates of the object depicted in the video scene, wherein the coordinates are relative to the GUI 100. Inset window coordinates instructions 512, when executed by the processor, cause the processor to, identify coordinates of an inset window 102 which is smaller than the GUI 100 and overlaps the video scene. Coordinate comparison instructions 514, when executed by the processor, cause the processor to compare the coordinates of the object with the coordinates of the inset window 102 to determine an overlap of the inset window 102 with the object. Display alteration instructions 516, when executed by the processor, cause the processor to alter a display characteristic of the inset window 102 to avoid the overlap of the inset window 102 with the object responsive to an identified overlap of the inset window and the object.

Figure 6:
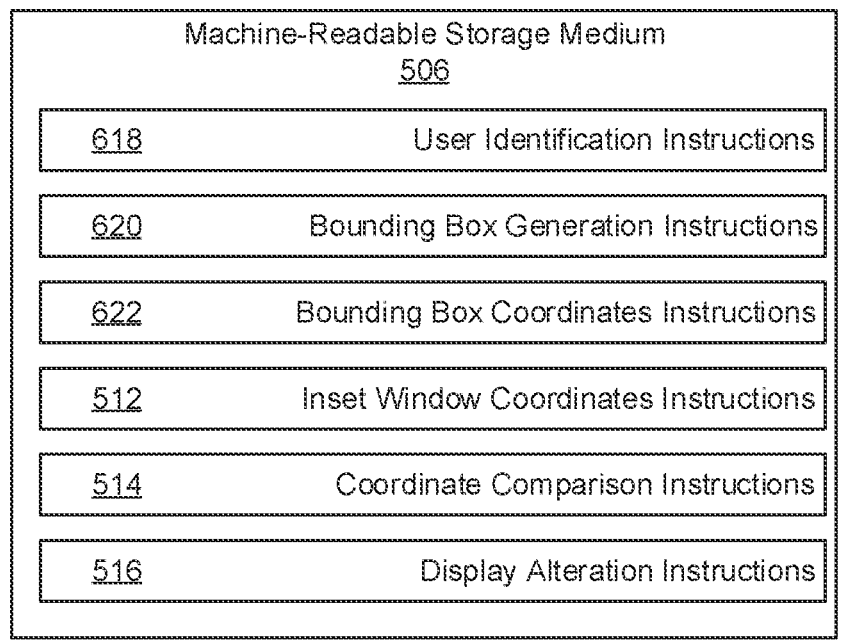
FIG. 6 depicts a non-transitory machine-readable storage medium for altering an inset window of a GUI, according to an example.

FIG. 6 depicts a non-transitory machine-readable storage medium 506 for altering an inset window of a GUI, according to an example. The machine-readable storage medium 506 includes a number of instructions 618, 620, 622, 512, 514, 516 for performing a designated function. The machine-readable storage medium 506 causes the processor to execute the designated function of the instructions 618, 620, 622, 512, 514, 516. The machine-readable storage medium 506 can store data, programs, instructions, or any other machine-readable data that can be utilized to operate the computing device. Machine-readable storage medium 506 can store computer readable instructions that the processor of the computing device can process, or execute. The machine-readable storage medium 506 can be an electronic, magnetic, optical, or other physical storage device that contains or stores executable instructions. Machine-readable storage medium 506 may be, for example, Random Access Memory (RAM), an Electrically Erasable Programmable Read-Only Memory (EEPROM), a storage device, an optical disc, etc. The machine-readable storage medium 506 may be a non-transitory machine-readable storage medium 506.

User identification instructions 618, when executed by the processor, cause the processor to, identify a user depicted in a video scene, wherein the video scene is displayed in a GUI 100. Bounding box generation instructions 620, when executed by the processor, cause the processor to, generate a bounding box 104 around a head of the user. Bounding box coordinates instructions 622, when executed by the processor, cause the processor to identify coordinates of the bounding box 104 of the head of the user, wherein the coordinates are relative to the GUI 100. Inset window coordinates instructions 512, when executed by the processor, cause the processor to, identify coordinates of an inset window 102 which is smaller than the GUI 100 and overlaps the video scene. Coordinate comparison instructions 514, when executed by the processor, cause the processor to compare the coordinates of the bounding box with the coordinates of the inset window 102 to determine an overlap of the inset window 102 with the object. Display alteration instructions 516, when executed by the processor, cause the processor to alter a display characteristic of the inset window 102 to avoid the overlap of the inset window 102 with the object responsive to an identified overlap of the inset window and the object.

Figure 7:
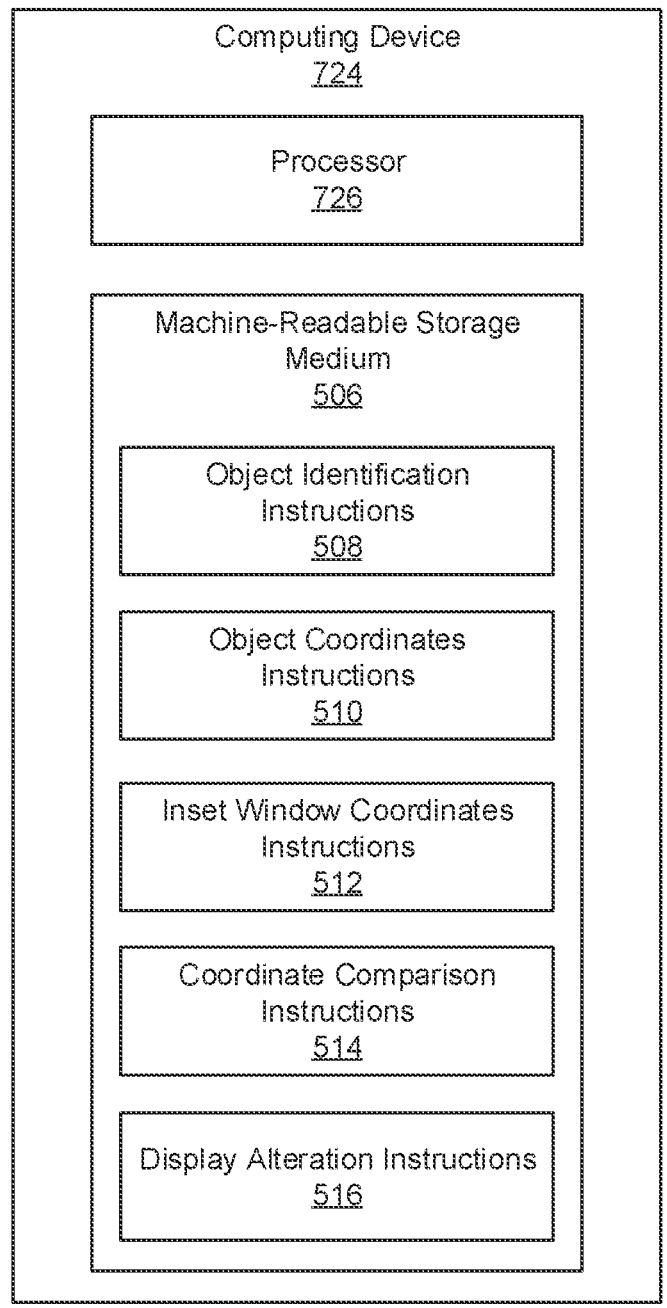
FIG. 7 depicts a computing device for altering an inset window of a GUI, according to an example.

FIG. 7 depicts a computing device 724 for altering an inset window of a GUI, according to an example. The computing device 724 may be a desktop computer, laptop computer, all-in-one device, tablet, or gaming system to name a few. To execute its intended functionality, the computing device 724 includes various hardware components, which may include a processor 726 and non-transitory machine-readable storage medium 506. The processor 726 may include the hardware architecture to retrieve executable code from the non-transitory machine-readable storage medium 506 and execute the executable code. As specific examples, the computing device 724 as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The non-transitory machine-readable storage medium 506 stores computer usable program code for use by or in connection with an instruction execution system, apparatus, or device. The non-transitory machine-readable storage medium 506 may take many types of memory including volatile and non-volatile memory. For example, the memory may include Random Access Memory (RAM), Read Only Memory (ROM), optical memory disks, and magnetic disks, among others. The executable code may, when executed by the processor 726 cause the processor 726 to implement the functionality described herein.

As described above, the processor 726 executes the object identification instructions 508 to, identify an object in a video scene, wherein the video scene is displayed in a GUI 100. The processor 726 executes the object coordinates instructions 510 to identify coordinates of the object depicted in the video scene, wherein the coordinates are relative of the GUI 100. The processor 726 executes the inset window coordinates instructions 512 to, identify coordinates of an inset window 102 which is smaller than the GUI 100 and overlaps the video scene. The processor 726 executes the coordinate comparison instructions 514 to compare the coordinates of the object with the coordinates of the inset window 102 to determine an overlap of the inset window 102 with the object. The processor 726 executes the display alteration instructions 516 to alter a display characteristic of the inset window 102 to avoid the overlap of the inset window 102 with the object responsive to an identified overlap of the inset window and the object.

What is claimed is:

1. A non-transitory machine-readable storage medium encoded with instructions executable by a processor of a computing device to, when executed by the processor, cause the processor to:
    identify, using a machine-learning engine, a first object depicted in a video scene as a face of a user, wherein the identification is based on a comparison by a machine-learning model of the video scene to a face model library, wherein the video scene is displayed in a graphical user interface (GUI);
    identify, using the machine-learning engine, a second object depicted in a video scene as a face of a second user;
    receive an audio signature associated with the video scene;
    identify, based on analyzing the audio signature, that the audio signature is associated with the first object depicted in the scene;
    determine that the first object is an active speaker;
    identify coordinates of the first object depicted in the video scene, wherein the coordinates are relative to the GUI;
    identify coordinates of the second object depicted in the video scene, wherein the coordinates are relative to the GUI;
    identify coordinates of an inset window which is smaller than the GUI and overlaps the video scene;
    compare the coordinates of the inset window with the first object and the second object to determine an overlap of the inset window with the first object and the second object; and
    responsive to an identified overlap of the inset window with the first object and the second object:
        identify from a set of regions a first region which results in a least amount of overlap of the inset window with the first object, wherein each region of the set of regions has a same size as the inset window, and wherein the first region causes the inset window to overlap with the second object; and
        move the inset window to the first region.

2. The non-transitory machine-readable storage medium of claim 1, wherein the instructions to compare the coordinates of the first object with the coordinates of the inset window comprise instructions to compare coordinates of a first corner of the first object with coordinates of a second corner of the inset window, wherein the first corner is opposite the second corner.

3. The non-transitory machine-readable storage medium of claim 1, further comprising instructions to alter a display characteristic of the inset window.

4. The non-transitory machine-readable storage medium of claim 3, wherein the instructions to move the inset window to the first region comprise:
    instructions to cause the processor to compare the coordinates of the first object with coordinates of the inset window at multiple candidate locations to determine an overlap of the inset window with the first object at the multiple candidate locations;
    instructions to cause the processor to identify for which candidate location the inset window would be largest with the least amount of overlap of the inset window with the first object; and
    instructions to cause the processor to move the inset window to the candidate location which would result in a largest inset window with the least amount of the overlap of the inset window with the first object.

5. The non-transitory machine-readable storage medium of claim 3, wherein the instructions to alter the display characteristic of the inset window comprise instructions to alter a transparency of the inset window responsive to the least amount of overlap being greater than a threshold amount.

6. The non-transitory machine-readable storage medium of claim 3, wherein the instructions to alter the display characteristic of the inset window comprise instructions to resize the inset window.

7. The non-transitory machine-readable storage medium of claim 6, wherein the instructions to resize the inset window comprise instructions to incrementally decrease a size of the inset window until a comparison of the coordinates of the first object and the coordinates of the inset window indicate the least amount of overlap of the inset window with the first object.

8. The non-transitory machine-readable storage medium of claim 1, further comprising instructions to, when executed by the processor, cause the processor to determine an amount of overlap of the inset window with the second object.

9. A method, comprising:
    identifying, via a processor of a computing device, using a machine-learning engine, a first user depicted in a video scene, wherein the identification is based on a comparison by a machine-learning model of the video scene to a face model library, wherein the video scene is displayed in a graphical user interface (GUI);
    identifying, using the machine-learning engine, a second user depicted in a video scene;
    receiving an audio signature associated with the video scene;

identifying, based on analyzing the audio signature, that the audio signature is associated with the first user depicted in the scene;
determining that the first user is an active speaker;
identifying, via the processor, coordinates of the first user depicted in the video scene, wherein the coordinates are relative to the GUI;
identifying, with the processor, coordinates of an inset window which is smaller than the GUI and overlaps the video scene;
comparing, via the processor, the coordinates of the inset window with the first user and the second user to determine an overlap of the inset window with the first user and the second user; and
responsive to an identified overlap of the inset window with the first user and the second user:
    identifying from a set of regions a first region which results in a least amount of overlap of the inset window with the first user, wherein each region of the set of regions has a same size as the inset window, and wherein the first region causes the inset window to overlap with the second user; and
    moving the inset window to the first region.

10. The method of claim 9, further comprising tracking a movement of the first user in the video scene.

11. The method of claim 9, wherein:
the video scene comprises a scene of multiple users; and
the inset window is to depict the first user.

12. The method of claim 9, further comprising determining an amount of overlap of the inset window with the second user.

13. A non-transitory machine-readable storage medium encoded with instructions executable by a processor of a computing device to, when executed by the processor, cause the processor to:
identify, using a machine-learning engine, a first user depicted in a video scene, wherein the identification is based on a comparison by a machine-learning model of the video scene to a face model library, wherein the video scene is displayed in a graphical user interface (GUI);
identify, using the machine-learning engine, a second user depicted in a video scene;
receive an audio signature associated with the video scene;
identify, based on analyzing the audio signature, that the audio signature is associated with the first user depicted in the scene;
determine that the first user is an active speaker;
generate a first bounding box around a head of the first user;
identify coordinates of the first bounding box of the head of the first user, wherein the coordinates are relative to the GUI;
generate a second bounding box around a head of the second user;
identify coordinates of the second bounding box of the head of the second user, wherein the coordinates are relative to the GUI;
identify coordinates of an inset window which is smaller than the GUI and overlaps the video scene;
compare the coordinates of the inset window with the first bounding box and the second bounding box to determine an overlap of the inset window with the first bounding box and the second bounding box; and
responsive to an identified overlap of the inset window with the first user and the second user:
    identify from a set of regions a first region which results in a least amount of overlap of the inset window with the first user, wherein each region of the set of regions has a same size as the inset window, and wherein the first region causes the inset window to overlap with the second user; and
    move the inset window to the first region.

14. The non-transitory machine-readable storage medium of claim 13, wherein the instructions to identify the first user depicted in the video scene comprise instructions to identify a landmark feature on a face of the first user.

15. The non-transitory machine-readable storage medium of claim 14, wherein the first bounding box is to envelop the landmark feature and a buffer area around the landmark feature.

16. The non-transitory machine-readable storage medium of claim 13, further comprising instructions to alter a display characteristic of the inset window.

17. The non-transitory machine-readable storage medium of claim 13, further comprising instructions to, when executed by the processor, cause the processor to identify a region within the video scene that is precluded from being a location to which the inset window is moved.

18. The non-transitory machine-readable storage medium of claim 17, wherein the region within the video scene that is precluded from being the location to which the inset window is moved is a location associated with a speaker in the video scene.

19. The non-transitory machine-readable storage medium of claim 13, further comprising instructions to, when executed by the processor, cause the processor to determine an amount of overlap of the inset window with the second user.

20. The non-transitory machine-readable storage medium of claim 13, wherein the instructions to generate the first bounding box around the head of the first user comprise instructions to:
display a request, the request indicating the first bounding box is to be drawn around the head of the first user; and
receive a response comprising the first bounding box.

\* \* \* \* \*